United States Patent
Stein et al.

(10) Patent No.: US 11,075,982 B2
(45) Date of Patent: Jul. 27, 2021

(54) SCALING HOSTS IN DISTRIBUTED EVENT HANDLING SYSTEMS

(71) Applicant: Nokia Solutions and Networks Oy, Espoo (FI)

(72) Inventors: Manuel Stein, Waiblingen (DE); Ivica Rimac, Remseck (DE); Istemi Ekin Akkus, Heidelberg (DE); Ruichuan Chen, Stuttgart (DE); Volker Hilt, Waiblingen (DE)

(73) Assignee: Nokia Solutions and Networks Oy, Espoo (FI)

( * ) Notice: Subject to any disclaimer, the term of this patent is extended or adjusted under 35 U.S.C. 154(b) by 268 days.

(21) Appl. No.: 15/645,728

(22) Filed: Jul. 10, 2017

(65) Prior Publication Data
US 2019/0014171 A1 Jan. 10, 2019

(51) Int. Cl.
| | |
|---|---|
| *H04L 29/08* | (2006.01) |
| *G06F 9/50* | (2006.01) |
| *G06F 9/54* | (2006.01) |
| *H04L 12/24* | (2006.01) |

(52) U.S. Cl.
CPC ........ *H04L 67/1008* (2013.01); *G06F 9/5027* (2013.01); *G06F 9/542* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 6,393,458 B1 * | 5/2002 | Gigliotti | G06F 9/505 707/999.01 |
| 6,993,771 B1 | 1/2006 | Hasha et al. | |
| 7,559,065 B1 * | 7/2009 | Sosnovsky | G06F 9/542 719/318 |
| 7,694,344 B1 * | 4/2010 | Fletcher | H04L 63/20 726/28 |
| 8,001,232 B1 * | 8/2011 | Saulpaugh | G06Q 30/06 709/224 |
| 8,463,939 B1 | 6/2013 | Galvin | |
| 2003/0007453 A1 | 1/2003 | Ogier et al. | |
| 2003/0065856 A1 | 4/2003 | Kagan et al. | |
| 2004/0019612 A1 | 1/2004 | Tyra et al. | |
| 2004/0078440 A1 | 4/2004 | Potter et al. | |

(Continued)

FOREIGN PATENT DOCUMENTS

| | | |
|---|---|---|
| EP | 1 107 556 A2 | 6/2001 |
| EP | 3 388 943 A1 | 10/2018 |
| EP | 3 389 222 A1 | 10/2018 |

OTHER PUBLICATIONS

International Search Report and Written Opinion mailed in corresponding PCT/US2018/041273 dated Oct. 10, 2018, 15 pages.

*Primary Examiner* — Younes Naji
(74) *Attorney, Agent, or Firm* — Tong, Rea, Bentley & Kim, LLC (57) ABSTRACT

The present disclosure generally discloses a host scaling capability for supporting scaling of hosts in a distributed event handling system. The host scaling capability may be configured to support scaling of hosts in a distributed event handling system which may use distributed queuing of events, distributed processing of events, and so forth. The distributed event handling system may be serverless cloud system or other type of distributed event handling system.

18 Claims, 7 Drawing Sheets

(56) References Cited

U.S. PATENT DOCUMENTS

| | | | |
|---|---|---|---|
| 2005/0038801 A1* | 2/2005 | Colrain | G06F 16/21 |
| 2006/0031572 A1 | 2/2006 | Feuerstein et al. | |
| 2008/0301175 A1 | 12/2008 | Applebaum et al. | |
| 2011/0173359 A1 | 7/2011 | Chakravarty et al. | |
| 2012/0117223 A1* | 5/2012 | Jennings | G06F 9/542 |
| | | | 709/224 |
| 2012/0191856 A1* | 7/2012 | Chen | H04L 67/26 |
| | | | 709/226 |
| 2012/0239792 A1 | 9/2012 | Banerjee et al. | |
| 2012/0278815 A1 | 11/2012 | Balko | |
| 2013/0036189 A1* | 2/2013 | Stevens, III | H04L 65/1006 |
| | | | 709/217 |
| 2013/0297770 A1* | 11/2013 | Zhang | G06F 9/505 |
| | | | 709/224 |
| 2014/0173112 A1 | 6/2014 | Seago et al. | |
| 2016/0034322 A1* | 2/2016 | Braudes | H04L 12/4625 |
| | | | 709/204 |
| 2016/0105370 A1* | 4/2016 | Mellor | H04L 47/522 |
| | | | 709/226 |
| 2017/0118310 A1 | 4/2017 | Gilliard et al. | |
| 2017/0214738 A1 | 7/2017 | Agarwal et al. | |
| 2018/0174578 A1* | 6/2018 | Bangalore | G06F 40/137 |
| 2018/0324222 A1 | 11/2018 | Carpenter | |

* cited by examiner

SCALING HOSTS IN DISTRIBUTED EVENT HANDLING SYSTEMS

TECHNICAL FIELD

The present disclosure relates generally to network technology and, more particularly but not exclusively, to scaling of hosts in event handling systems.

BACKGROUND

Event handling systems may be used to handle various types of events that are associated with various types of services or applications. Event handling systems may be centralized or distributed. Event handling in distributed event handling systems, such as serverless cloud systems and other types of distributed event handling systems, may be complicated. Scaling of hosts in distributed event handling systems also may be complicated.

SUMMARY

The present disclosure generally discloses scaling of hosts in event handling systems.

In at least some embodiments, an apparatus is provided. The apparatus is configured to support scaling of hosts in a distributed event handling system. The apparatus includes a processor and a memory communicatively connected to the processor. The processor is configured to determine, from a set of hosts for an event type of events configured to be processed based on an event processing function for the event type, at least one of a set of publisher hosts configured to publish events of the event type or a set of subscriber hosts configured to process events of the event type. The processor is configured to determine, based on at least one of the set of publisher hosts or the set of subscriber hosts, a set of candidate subscriber hosts which are candidates to begin handling events of the event type. The processor is configured to select, from the set of candidate subscriber hosts, a selected candidate subscriber host. The processor is configured to initiate configuration of the selected candidate subscriber host to begin handling events of the event type. In at least some embodiments, a non-transitory computer-readable storage medium stores instructions which, when executed by a computer, cause the computer to perform a corresponding method for supporting scaling of hosts in a distributed event handling system. In at least some embodiments, a corresponding method for supporting scaling of hosts in a distributed event handling system is provided.

In at least some embodiments, an apparatus is provided. The apparatus is configured to support scaling of hosts in a distributed event handling system. The apparatus includes a processor and a memory communicatively connected to the processor. The processor is configured to determine, from a set of hosts for an event type of events configured to be processed based on an event processing function for the event type, at least one of a set of publisher hosts configured to publish events of the event type or a set of subscriber hosts configured to process events of the event type. The processor is configured to determine, based on at least one of the set of publisher hosts or the set of subscriber hosts, a set of candidate subscriber hosts which are candidates to stop handling events of the event type. The processor is configured to select, from the set of candidate subscriber hosts, a selected candidate subscriber host. The processor is configured to initiate configuration of the selected candidate subscriber host to stop handling events of the event type. In at least some embodiments, a non-transitory computer-readable storage medium stores instructions which, when executed by a computer, cause the computer to perform a corresponding method for supporting scaling of hosts in a distributed event handling system. In at least some embodiments, a corresponding method for supporting scaling of hosts in a distributed event handling system is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses a host scaling capability for supporting scaling of hosts in a distributed event handling system. The host scaling capability may be configured to support scaling of hosts in a distributed event handling system which may use distributed queuing of events, distributed processing of events, and so forth. The distributed event handling system may be serverless cloud system or other type of distributed event handling system. It will be appreciated that these and various other embodiments and advantages and potential advantages of the host scaling capability may be further understood by way of reference to the example communication system of FIG. 1.

Figure 1:
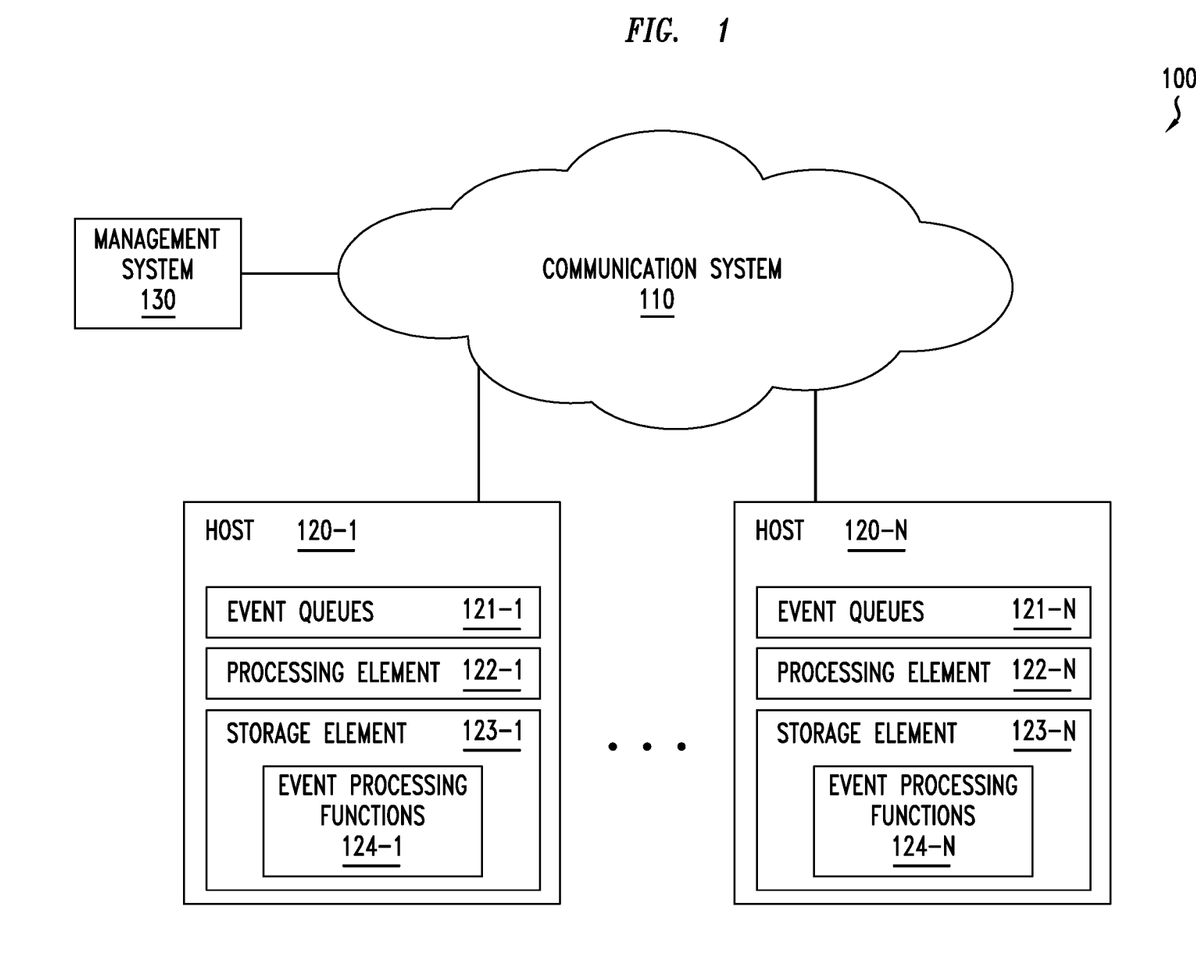
FIG. 1 depicts an event handling system configured to support distributed handling of events.

FIG. 1 depicts an event handling system configured to support distributed handling of events.

The event handling system 100 includes a communication system 110, a set of hosts 120-1-120-N (collectively, hosts 120), and a management system (MS) 130.

The communication system 110 may be any type of communication system configured to support communications within the event handling system 100. The communication system 110 may be any type of communication system configured to support communications of the hosts 120 (e.g., communication of events from ones of the hosts 120 operating as publishers of the events, communication of events to ones of the hosts 120 operating as subscribers to the events, communication of event processing responses from hosts 120 based on processing of events by the hosts 120, or the like, as well as various combinations thereof) and communications of the MS 130 (e.g., communication of management messages associated with scaling of the hosts 120). The communication system 110 may be a communication network (e.g., a wireline communication network, a wireless communication network, or the like, as well as various combinations thereof), a messaging system, or the like, as well as various combinations thereof.

The hosts 120 may be any types of hosts configured to support handling of events. The hosts 120 each may be configured to operate as publishers of events, subscribers to events, or both. The hosts 120 include respective sets of elements configured to enable the hosts 120 to support handling of events. The hosts 120 include respective sets of event queues 121 configured to store events received by the hosts 120 for processing by the hosts 120 (e.g., hosts 120 queue events for respective event types to be supported by the hosts 120). The hosts 120 include respective processing elements 122 configured to enable the hosts 120 to provide various functions discussed herein (e.g., queuing of events awaiting processing at the hosts 120, processing of events by the hosts 120, configuration of the hosts 120 in a manner supporting scaling of the hosts 120, or the like, as well as various combinations thereof). The hosts 120 include respective storage elements 123 storing event processing functions 124 configured for use by the hosts 120 to process events at the hosts 120 (e.g., hosts 120 store respective event processing functions 124 for respective event types to be supposed by the hosts 120). The hosts 120 may be implemented in various ways (e.g., the hosts 120 may be physical hosts (e.g., servers), virtual hosts (e.g., virtual machines (VMs), virtual containers (VCs), or the like), or the like, as well as various combinations thereof), may be distributed in various ways (e.g., physical hosts that are geographically distributed, virtual hosts that are distributed across physical servers, or the like, as well as various combinations thereof), or the like, as well as various combinations thereof.

The MS 130 is configured to control scaling of the hosts 120 for supporting handling of events. The MS 130 may be configured to control scaling of the hosts 120 for supporting handling of events of a particular event type using a particular event processing function configured for use in processing events of that event type. The MS 130 may be configured to control scaling of the hosts 120 based on detection of a condition (e.g., detected by the MS 130), based on a request by another element (e.g., which may request that the MS 130 perform scaling of the hosts 120 for supporting handling of events of the event type), or the like. The MS 130 may be configured to control scaling of the hosts 120, for supporting handling of events of a particular event type, based on information indicative of the flow of information between the hosts 120 (e.g., publishing and subscribing rates, event forwarding statistics, characteristics of ancillary information used in processing events (e.g., locations, quantities, or the like), or the like, as well as various combinations thereof). The MS 130 may be configured to control scaling of the hosts 120, for supporting handling of events of a particular event type, in a manner tending to localize events (and, thus, workload) of the event type. The MS 130 may be configured to control scaling of the hosts 120 in various other ways (e.g., responsive to other conditions or messages, based on evaluation of other types of information, or the like, as well as various combinations thereof).

The MS 130 may be configured to control scaling of the hosts 120, for supporting handling of events of a particular event type, by performing scale out of hosts 120 for supporting handling of events of the particular event type or performing scale in of hosts 120 for supporting handling of events of the particular event type. The scaling of the hosts 120 for handling events of a particular event type may include scale out of the hosts 120 that support handling of events of the event type (increasing event processing capacity for the event type by configuring one or more hosts 120 to support processing of events of that event type), embodiments of which are presented with respect to FIGS. 2-4. The scaling of the hosts 120 for handling events of a particular event type may include scale in of the hosts 120 that support handling of events of the event type (reducing event processing capacity for the event type by configuring one or more hosts 120 to stop supporting processing of events of that event type), embodiments of which are presented with respect to FIG. 5.

The MS 130 may include various functions configured to support control over scaling of the hosts 120 for supporting handling of events. For example, MS 130 may include a queue monitoring function configured to monitor various event queues within the event handling system 100 (e.g., the event queues 121 of the hosts 120, event queues of one or more message buses which may be used to queue events arriving to the event handling system 100 or being exchanged between hosts 120 within the event handling system 100, or the like, as well as various combinations thereof). For example, the MS 130 may include a function manager configured to initiate scaling of the hosts 120 responsive to determinations to scale the hosts 120 (e.g., responsive to detection of conditions based on monitoring of event queues by a queue monitoring function). The MS 130 may be configured to provide various other functions supporting control over scaling of the hosts 120 for supporting handling of events.

The event handling system 100 may be a serverless cloud system. In a serverless cloud system, which also may be referred to as a function-as-a-service (FaaS) cloud resources are utilized based on demand from the applications and services with the clients being charged based on the amount of resources consumed and with the management of those resources being transparent or substantially transparent to the clients. In a serverless cloud system, the applications or services generally follow an event-driven programming model in which the event processing functions of the application or service are triggered by events within the serverless cloud system (e.g., a specific web browsing action by an end user, uploading of an image to a storage server, or the like). In a serverless cloud system, the handling of a request to the application or service in order to provide an associated response from the application or service may be based on a graph of event processing functions that is configured to handle respective events associated with providing the response to the request, where the graph of event processing functions may be distributed across the resources in various ways. For example, the event processing functions may be distributed across hosts 120 in various ways, such that the hosts 120 may exchange events in order to support completion of the response to the request (e.g., an output based on processing of an event by an event processing function of a host 120 may be provided as an input event to be processed by that host 120 and/or one or more other hosts 120). It will be appreciated that the event handling system 100 may be any other suitable type of event handling system in which events may be processed (e.g., a traditional cloud system in which clients request virtual resources to be used to handle processing of events or the like); however, various embodiments of the event handling capability are primarily presented herein within the context of a serverless cloud system.

The event handling system 100 is configured to support distributed handling of events. The events may be events of one or more applications or services supported by the event handling system 100. The events may be external arriving at the event handling system 100 from one or more external source of the events (e.g., requests from clients, requests from network devices, or the like), internal events generated within the event handling system 100 by one or more hosts 120 of the event handling system 100 (e.g., as discussed above, outputs by hosts 120 based on processing of events by event processing functions of the hosts 120 may be inputs, or events, to be processed by hosts 120), or the like, as well as various combinations thereof. The events may include events of one or more event types (e.g., multiple event types associated with respective applications or services, multiple event types supported by a given application or service, or the like, as well as various combinations thereof). For example, where the event handling system 100 supports a database service, events of a first event type may be requests to retrieve data from the database and events of a second event type may be requests to write data in the database. For example, where the event handling system supports a web browsing service, events may include external events (e.g., requests from clients) and internal events (e.g., requests for respective pieces of information to be assembled in order to return associated responses to the clients and processing to assemble the respective pieces of information in order to return associated responses to the clients). It will be appreciated that the event handling system 100 may be configured to handle various other types of events, applications or services, or the like, as well as various combinations thereof.

It will be appreciated that the event handling system 100, although primarily presented as being organized in a particular manner, may be organized in various other ways (e.g., using other numbers, types, or arrangements of communication systems, using other numbers, types, or arrangement of hosts, or the like, as well as various combinations thereof).

Figure 2:
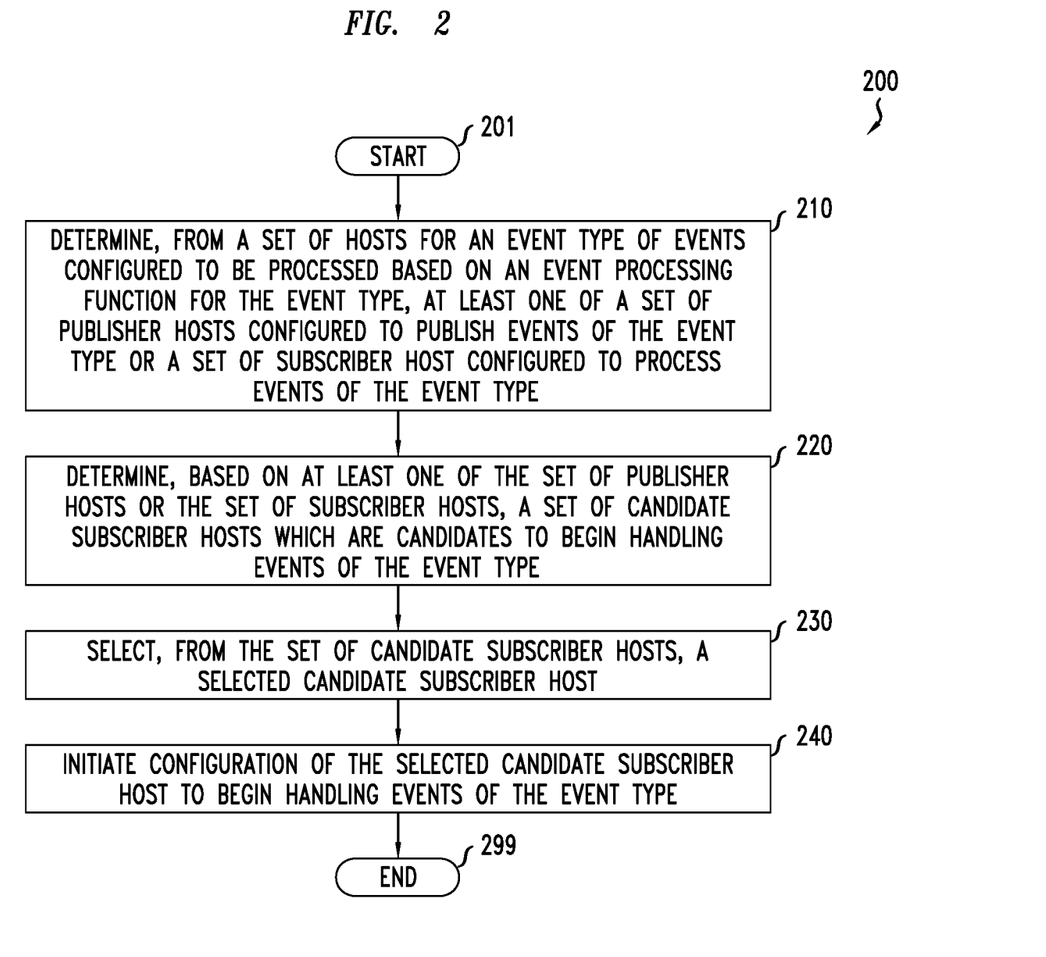
FIG. 2 depicts an embodiment of a method for supporting scale out of hosts that support handling events of a particular event type.

FIG. 2 depicts an embodiment of a method for supporting scale out of hosts that support handling events of a particular event type. The method 200 for supporting scale out of hosts that support handling events of a particular event type may be performed by a management system (e.g., MS 130 of FIG. 1). It will be appreciated that, although primarily presented herein as being performed serially, at least a portion of the functions of method 200 may be performed contemporaneously or in a different order than as presented in FIG. 2.

At block 201, method 200 begins.

At block 210, determine, from a set of hosts for an event type of events configured to be processed based on an event processing function for the event type, at least one of a set of publisher hosts configured to publish events of the event type or a set of subscriber hosts configured to process events of the event type. The set of hosts may be referred to as HOSTS H. The event type may be referred to as event type A. The set of publisher hosts, which may be referred to as PUBLISHERS (A), may be a subset of the set of hosts H. The set of subscriber hosts, which may be referred to as SUBSCRIBERS (A), may be a subset of the set of hosts H. The set of publishers and the set of subscribers may or may not overlap.

At block 220, determine, based on at least one of the set of publisher hosts or the set of subscriber hosts, a set of candidate subscriber hosts which are candidates to begin handling events of the event type.

The set of candidate subscriber hosts may be determined to be ones of the hosts that are included in the set of hosts but that are not included in the set of subscriber hosts (which may be represented as CANDIDATES=HOSTS−SUBSCRIBERS).

The set of candidate subscriber hosts may be determined to be ones of the hosts that are included in the set of publisher hosts but that are not included in the set of subscriber hosts (which may be represented as CANDIDATES=PUBLISHERS−SUBSCRIBERS). It is noted that performing scale out using a publisher host tends to localize the workload of the event type (e.g., some or all of items in the execution context of the workflow may have been cached at the publisher host and, thus, do not need to be fetched again for the processing events of the event type).

At block 230, select, from the set of candidate subscriber hosts, a selected candidate subscriber host.

The selected candidate subscriber host may be selected from the set of candidate subscriber hosts in various ways.

The selected candidate subscriber host may be selected from the set of candidate subscriber hosts based on information configured for use in evaluating the candidate subscriber hosts for selection. The selected candidate subscriber host may be selected from the set of candidate subscriber hosts based on information indicative of the flow of information between the hosts (e.g., publishing and subscribing rates, event forwarding statistics, characteristics of ancillary information used in processing events (e.g., locations, quantities, or the like), or the like, as well as various combinations thereof). The selected candidate subscriber host may be selected from the set of candidate subscriber hosts based on scores associated with the candidate subscriber hosts (which may be computed based on various types of information).

The selected candidate subscriber host may be selected from the set of candidate subscriber hosts based on an ordered list of the candidate subscriber hosts. The candidate subscriber hosts may be arranged within the ordered list of the candidate subscriber hosts in various ways (e.g., randomly, based on information indicative of the flow of information between the hosts, based on scores associated with the candidate subscriber hosts, or the like, as well as various combinations thereof).

The selected candidate subscriber host may be selected from the set of candidate subscriber hosts based on respective candidate scores of the respective candidate subscriber hosts (e.g., selecting a candidate subscriber host having the greatest candidate score). The respective candidate scores of the respective candidate subscriber hosts may be based on respective load contributions of the respective candidate subscriber hosts to an overall workload for the event type. The respective candidate scores of the respective candidate subscriber hosts may be based on a score function configured to favor ones of the hosts that most contribute to an overall workload for the event type. The respective candidate scores of the respective candidate subscriber hosts may be based on respective geometric means of the contribution of the candidate subscriber hosts to an overall workload of the event type. The respective candidate scores of the respective candidate subscriber hosts may be based on other types of information, other types of score functions, or the like, as well as various combinations thereof.

The selected candidate subscriber host may be selected from the set of candidate subscriber hosts based on respective candidate scores of the respective candidate subscriber hosts. The respective candidate scores of the respective candidate subscriber hosts may be based on monitoring of the contributions of the publisher hosts to the event processing function queues of the respective candidate subscriber hosts. The contribution of a publisher host to the event processing function queue of a candidate subscriber host may be a proportional contribution (e.g., amounts of events) indicative of utilization of the event processing function queue of the candidate subscriber host, an integral contribution (e.g., accumulated amounts of events) indicative of an extent of utilization of the event processing function queue of the candidate subscriber host, a derivative contribution (e.g., accumulated amounts of events over time) indicative of a change of utilization of the event processing function queue of the candidate subscriber host, or the like. The candidate score, Score(A,h$_i$), of a candidate subscriber host h$_i$ for an event type A may be a geometric mean of the contribution of the candidate subscriber host h$_i$ to the overall workload for the event type A. Let E$_{i,j}$ A (t) be a number of events that candidate subscriber host h$_i$ emits to the queue at a subscriber host h$_j$ for event type A at a time t. Let E$_{i,j}$ A be the windowed integral of the contribution of the candidate subscriber host h$_i$, which may be represented as: $E_{i,j}^A = \int_{t-\Delta t_0}^{t} E_{A,j}^i(t)$ Then, the geometric mean of the contribution (in this case, for the integral contribution) of the candidate subscriber host h$_i$ to all queues of event type A may be defined as:

$$\emptyset A_i = {}_{|Sub(A)|}\sqrt{\prod_{h_j \in Sub(A)} E_{i,j}^A}.$$

The selected candidate subscriber host may be selected from the set of candidate subscriber hosts based on respective candidate scores of the respective candidate subscriber hosts that are based on such geometric means of the contributions of the candidate subscriber hosts to the queues of event type A. It will be appreciated that similar geometric means may be computed for other contribution types (e.g., proportional contributions, derivative contribution, or the like).

The selected candidate subscriber host may be selected from the set of candidate subscriber hosts based on various combinations of the above-described techniques.

At block 240, initiate configuration of the selected candidate subscriber host to begin handling events of the event type. The configuration of the selected candidate subscriber host to begin handling events of the event type may include sending, toward the selected candidate subscriber host, a request for the selected candidate consumer host to obtain the event processing function for the event type and to subscribe to receive events of the event type. The candidate subscriber host may obtain the event processing function for the event type from any suitable source of the event processing function (e.g., from the management system, from a central repository of event processing functions, based on replication from one of the other hosts, or the like). The candidate subscriber host may subscribe to receive events of the event type by subscribing to one or more event queues queuing events of the event type (e.g., one or more queues of a message bus supporting distributed queuing of events of the event type). The candidate subscriber host, upon obtaining the event processing function for the event type and subscribing to receive events of the event type, is configured to operate as a subscriber that may handle events of the event type.

At block 299, method 200 ends.

It will be appreciated that, although omitted from method 200 of FIG. 2 for purposes of clarity, the selected candidate subscriber host may accept or reject the request from the management system. If the selected candidate subscriber host accepts the request from the management system, the selected candidate subscriber host is configured to support handling of events of the event type and begins handling events of the event type. If the selected candidate subscriber host rejects the request from the management system, the selected candidate subscriber host informs the management system of the rejection and the management system may select a next candidate subscriber host from the set of candidate subscriber hosts and send to the next candidate subscriber host a request for the next candidate consumer host to obtain the event processing function for the event type and to subscribe to receive events of the event type.

It will be appreciated that, although omitted from method 200 of FIG. 2 for purposes of clarity, if the set of candidate subscriber hosts is empty (e.g., initially empty or becomes empty where none of the candidate subscriber hosts agrees to support the event processing function for the event type), the management system may decline the request to scale out the event processing function.

It will be appreciated that method 200 of FIG. 2 may be further understood by way of reference to an example (presented with respect to FIGS. 3 and 4A-4C.

Figure 3:
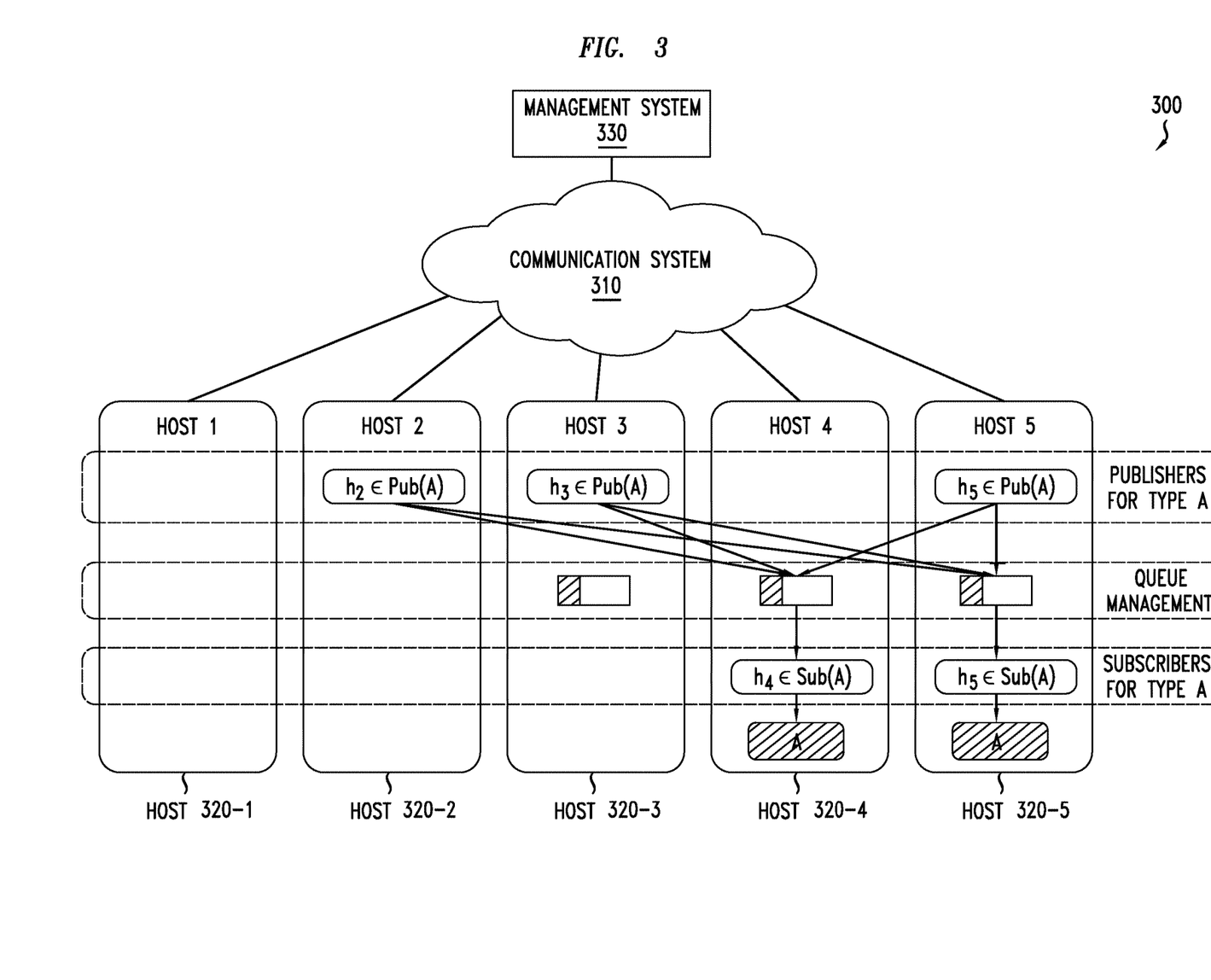
FIG. 3 depicts an example of an event handling system configured to support distributed handling of events.

FIG. 3 depicts an example of an event handling system configured to support distributed handling of events.

In the example of FIG. 3, the event handling system 300 is configured to handle events of a particular event type (referred to as event type A).

In the example of FIG. 3, the event handling system 300 includes a communication system 310 configured to support communications of the event handling system 300.

In the example of FIG. 3, the event handling system 300 includes a set of five hosts 320-1-320-5 (collectively, hosts 320, which are also referred to as host 1, host 2, host 3, host 4, and host 5, respectively, and which also may be denoted as a set of hosts H) which may support handling of events of event type A, and supports distributed event queuing for events of event type A. The hosts 320 may be configured to operate as publishers of events of event type A, as subscribers to events of event type A, or both. In the example of FIG. 3, host 2, host 3, and host 5 are operating as publishers of events of event type A (also denoted as Pub(A)) and host 4 and host 5 are operating as subscribers to events of event type A (also denoted as Sub(A)). The subscribing hosts (namely, host 4 and host 5) are configured to support processing of events of event type. Namely, host 4 and host 5 each include a respective event queue 321 (illustratively, event queue 321-4 on host 4 and event queue 321-5 on host 5) configured to queue events of event type A while the events await processing and host 4 and host 5 each include a respective instance of the event processing function 324 (illustratively, event processing function 324-4 on host 4 and event processing function 324-5 on host 5) that is configured to support processing of events of event type A. It is noted that the distributed queue management capability also may replicate events internally for reliability (e.g., as indicated by the replica event queue 321-3 on host 3 even though host 3 is not a subscriber to event type A).

In the example of FIG. 3, the event handling system 300 includes a management system (MS) 330. The MS 330 is configured to support control over scaling of the hosts 320 to support handling of events of event type A. The MS 330 may determine that an additional subscriber host is required for handling of events of event type A (e.g., based on a determination, based on monitoring of the event queues 321 supporting the distributed queuing of events of event type A, that an additional subscriber host is needed to service the incoming event rate for event type A). The MS 330, based on a determination that an additional subscriber host is required for handling of events of event type A, determines a set of candidate subscriber hosts (denoted as CANDIDATES(A)) from the set of hosts 320, selects one of the candidate subscriber hosts as a selected subscriber host for handling events of event type A, and initiates configuration of the selected subscriber host to handle events of event type A (e.g., replicating the event processing function for event type A on the selected subscriber host, supporting queuing of events of event type A for the selected subscriber host, and so forth).

The MS 330, as discussed herein may determine the set of candidate subscriber hosts (CANDIDATES(A)) from the set of hosts 320 in a number of ways. It is noted that the manner in which MS 330 determines the set of candidate subscriber hosts from the set of hosts 320 may be further understood by considering the host set logic that is depicted in FIGS. 4A-4C.

Figure 4A:
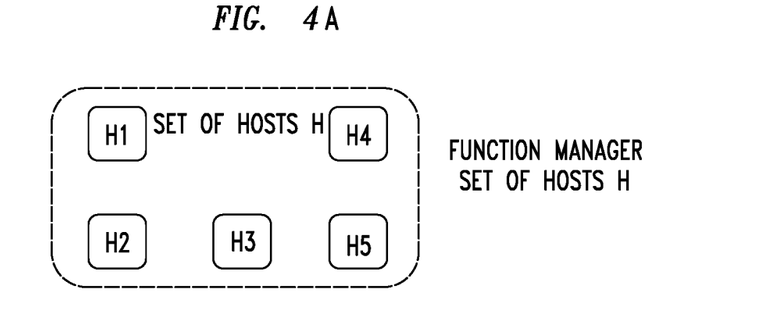
FIGS. 4A-4C depict logical sets of hosts of FIG. 3 which may be used for determining a candidate subscriber host to provide scale in for an event type.
Figure 4B:
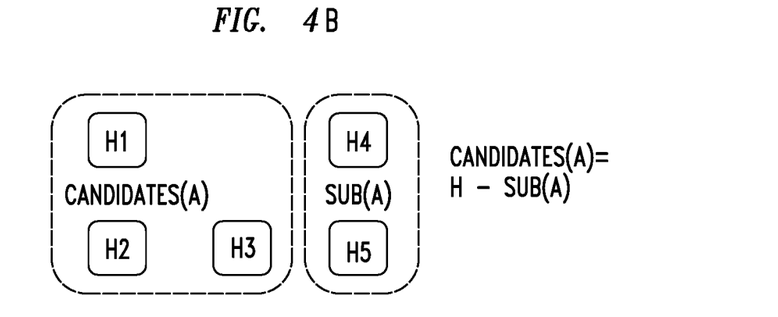
Figure 4C:
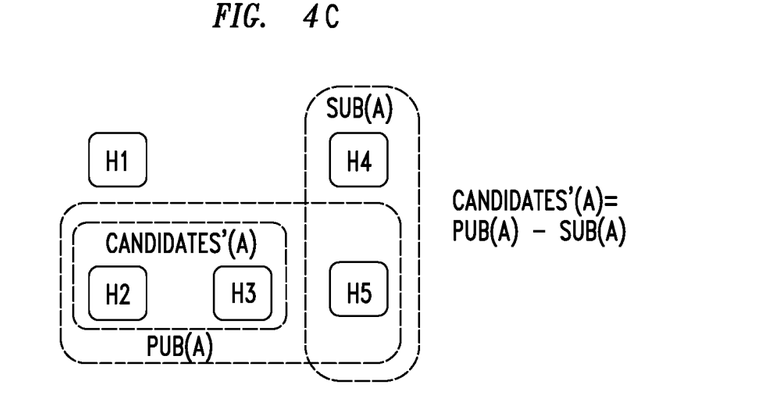

The host set logic for the set of hosts 320 (set of hosts H) is depicted in FIG. 4A (the five hosts 320 of the event handling system 300 are included).

The set of candidate subscriber hosts (CANDIDATES (A)) may be determined to be ones of the hosts 320 that are included in the set of hosts 320 (H) but that are not included in the set of subscriber hosts (SUB(A)), which may be represented as CANDIDATES(A)=H−SUB(A). The host set logic for this is depicted in FIG. 4B (illustratively, host 1, host 2 and host 3 are candidate subscriber hosts since they are included in the set of host H but are not currently subscriber hosts (SUB(A))).

The set of candidate subscriber hosts (CANDIDATES (A)) may be determined to be ones of the hosts that are included in the set of publisher hosts (PUB(A)) but that are not included in the set of subscriber hosts (SUB(A)), which may be represented as CANDIDATES'(A)=PUB(A)−SUB (A). The host set logic for this is depicted in FIG. 4C (illustratively, host 2 and host 3 are candidate subscriber hosts since they are included in the set of publisher hosts (PUB(A) but are not currently subscriber hosts (SUB(A))).

It will be appreciated that the set of candidate subscriber hosts may be determined in various other ways for use in selecting one of the candidate subscriber hosts to be the selected subscriber host.

The MS 330, as discussed herein may select the selected subscriber host from the set of candidate subscriber hosts (CANDIDATES(A)) in a number of ways. The selected candidate subscriber host may be selected from the set of candidate subscriber hosts based on respective candidate scores of the respective candidate subscriber hosts, which may be based on respective geometric means of the contribution of the candidate subscriber hosts to an overall workload of event type A. It is noted that example geometric means for each of the publisher hosts are presented in TABLE 1 below.

TABLE 1

| $E_{i,j}$ | | subscriber $h_j$ | | |
|---|---|---|---|---|
| | | $h_4$ | $h_5$ | $@A_i$ |
| publisher $h_i$ | $h_1$ | 0 | 0 | 0 |
| | $h_2$ | 4 | 4 | 4 |
| | $h_3$ | 5 | 3 | 3.87 |
| | $h_4$ | 0 | 0 | 0 |
| | $h_5$ | 2 | 6 | 3.46 |

The MS 330, based on the example geometric means of Table 1, may select host 3 as the selected subscriber host that is then configured to operate as a subscriber host for events of event type A. It will be appreciated that the candidate subscriber hosts may be evaluated in various other ways for selecting one of the candidate subscriber hosts to be the selected subscriber host.

It will be appreciated that the event handling system 300, although primarily presented as being organized in a particular manner, may be organized in various other ways (e.g., using other numbers, types, or arrangements of communication systems, using other numbers, types, or arrangement of hosts, or the like, as well as various combinations thereof).

Figure 5:
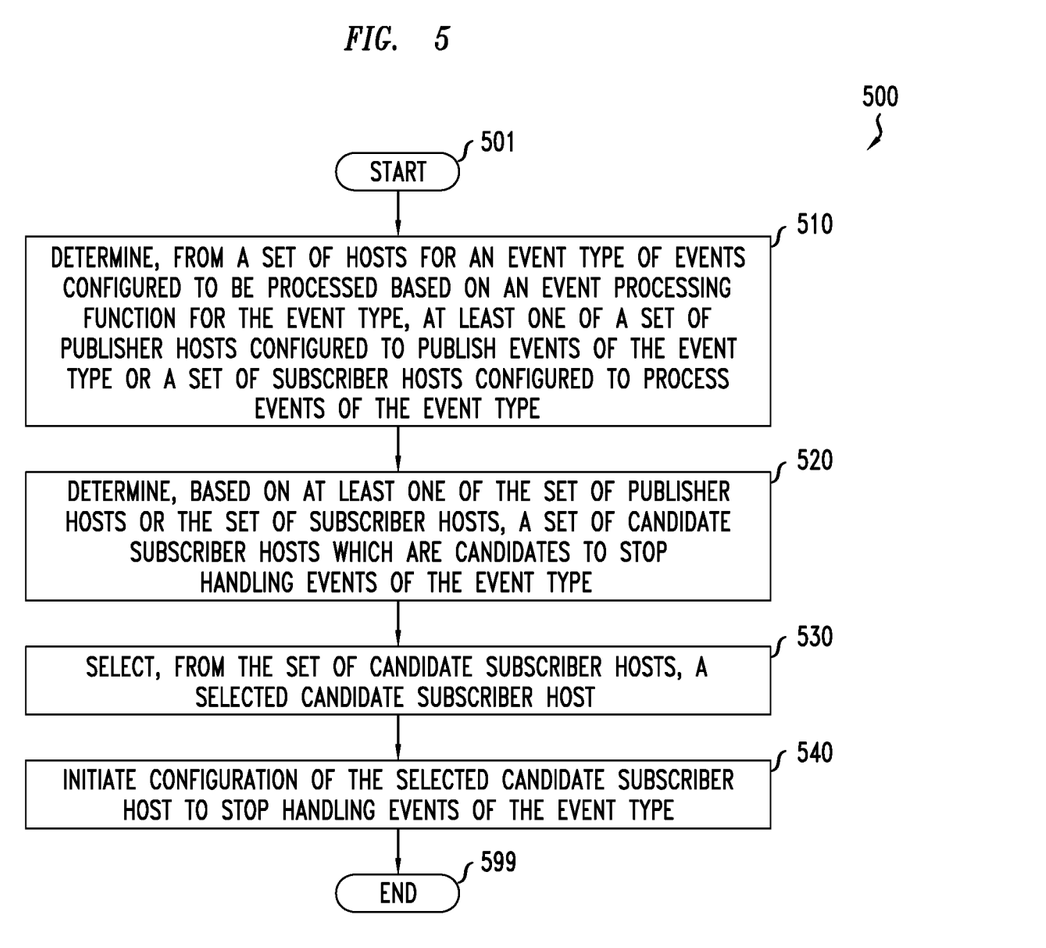
FIG. 5 depicts an embodiment of a method for supporting scale in of hosts that support handling events of a particular event type.

FIG. 5 depicts an embodiment of a method for supporting scale in of hosts that support handling events of a particular event type. The method 500 for supporting scale out of hosts that support handling events of a particular event type may be performed by a management system (e.g., MS 130 of FIG. 1). It will be appreciated that, although primarily presented herein as being performed serially, at least a portion of the functions of method 500 may be performed contemporaneously or in a different order than as presented in FIG. 5.

At block 501, method 500 begins.

At block 510, determine, from a set of hosts for an event type of events configured to be processed based on an event processing function for the event type, at least one of a set of publisher hosts configured to publish events of the event type or a set of subscriber hosts configured to process events of the event type. The set of hosts may be referred to as HOSTS H. The event type may be referred to as event type A. The set of publisher hosts, which may be referred to as PUBLISHERS (A), may be a subset of the set of hosts H. The set of subscriber hosts, which may be referred to as SUBSCRIBERS (A), may be a subset of the set of hosts H. The set of publishers and the set of subscribers may or may not overlap.

At block 520, determine, based on at least one of the set of publisher hosts or the set of subscriber hosts, a set of candidate subscriber hosts which are candidates to stop handling events of the event type.

The set of candidate subscriber hosts may be determined to be ones of the hosts that are included in the set of subscriber hosts (which may be represented as CANDIDATES=SUBSCRIBERS).

The set of candidate subscriber hosts may be determined to be ones of the hosts that are included in the set of subscriber hosts but that are not included in the set of publisher hosts (which may be represented as CANDIDATES=SUBSCRIBERS−PUBLISHERS). It is noted that performing scale in using a subscriber host tends to localize the workload of the event type (e.g., some or all of items in the execution context of the workflow may have been cached at the publisher host and, thus, do not need to be fetched again for the processing events of the event type).

At block 530, select, from the set of candidate subscriber hosts, a selected candidate subscriber host.

The selected candidate subscriber host may be selected from the set of candidate subscriber hosts in various ways.

The selected candidate subscriber host may be selected from the set of candidate subscriber hosts based on information configured for use in evaluating the candidate subscriber hosts for selection. The selected candidate subscriber host may be selected from the set of candidate subscriber hosts based on information indicative of the flow of information between the hosts (e.g., publishing and subscribing rates, event forwarding statistics, characteristics of ancillary information used in processing events (e.g., locations, quantities, or the like), or the like, as well as various combinations thereof). The selected candidate subscriber host may be selected from the set of candidate subscriber hosts based on scores associated with the candidate subscriber hosts (which may be computed based on various types of information).

The selected candidate subscriber host may be selected from the set of candidate subscriber hosts based on an ordered list of the candidate subscriber hosts. The candidate subscriber hosts may be arranged within the ordered list of the candidate subscriber hosts in various ways (e.g., randomly, based on information indicative of the flow of information between the hosts, based on scores associated with the candidate subscriber hosts, or the like, as well as various combinations thereof).

The selected candidate subscriber host may be selected from the set of candidate subscriber hosts based on respective candidate scores of the respective candidate subscriber hosts (e.g., selecting a candidate subscriber host having the greatest candidate score). The respective candidate scores of the respective candidate subscriber hosts may be based on respective load contributions of the respective candidate subscriber hosts to an overall workload for the event type. The respective candidate scores of the respective candidate subscriber hosts may be based on a score function configured to favor ones of the hosts that least contribute to an overall workload for the event type. The respective candidate scores of the respective candidate subscriber hosts may be based on respective geometric means of the contribution of the candidate subscriber hosts to an overall workload of the event type. The respective candidate scores of the respective candidate subscriber hosts may be based on other types of information, other types of score functions, or the like, as well as various combinations thereof.

The selected candidate subscriber host may be selected from the set of candidate subscriber hosts based on respective candidate scores of the respective candidate subscriber hosts. The respective candidate scores of the respective candidate subscriber hosts may be based on monitoring of the contributions of the publisher hosts to the event processing function queues of the respective candidate subscriber hosts. The contribution of a publisher host to the event processing function queue of a candidate subscriber host may be a proportional contribution (e.g., amounts of events) indicative of utilization of the event processing function queue of the candidate subscriber host, an integral contribution (e.g., accumulated amounts of events) indicative of an extent of utilization of the event processing function queue of the candidate subscriber host, a derivative contribution (e.g., accumulated amounts of events over time) indicative of a change of utilization of the event processing function queue of the candidate subscriber host, or the like. The candidate score, Score(A,$h_i$), of a candidate subscriber host $h_i$ for an event type A may be a geometric mean of the contribution of the candidate subscriber host $h_i$ to the overall workload for the event type A. Let $E_{i,j}$ A (t) be a number of events that candidate subscriber host $h_i$ emits to the queue at a subscriber host $h_j$ for event type A at a time t. Let $E_{i,j}$ A be the windowed integral of the contribution of the candidate subscriber host $h_i$, which may be represented as: $E_{i,j}{}^A = \int_{t-\Delta t_0}^{t} E_{A,j}{}^i(t)$. Then, the geometric mean of the contribution (in this case, for the integral contribution) of the candidate subscriber host $h_i$ to all queues of event type A may be defined as:

$$\emptyset A_i = {}^{|Sub(A)|}\sqrt{\prod_{h_j \in Sub(A)} E_{i,j}^A}.$$

The selected candidate subscriber host may be selected from the set of candidate subscriber hosts based on respective candidate scores of the respective candidate subscriber hosts that are based on such geometric means of the contributions of the candidate subscriber hosts to the queues of event type A. It will be appreciated that similar geometric means may be computed for other contribution types (e.g., proportional contributions, derivative contribution, or the like).

The selected candidate subscriber host may be selected from the set of candidate subscriber hosts based on various combinations of the above-described techniques.

At block 540, initiate configuration of the selected candidate subscriber host to stop handling events of the event type. The configuration of the selected candidate subscriber host to stop handling events of the event type may include sending, toward the selected candidate subscriber host, a request for the selected candidate consumer host to remove the event processing function for the event type and to unsubscribe from receiving events of the event type. The candidate subscriber host may remove the event processing function for the event type by deleting the event processing function, marking the event processing function for deletion, or the like. The candidate subscriber host may unsubscribe from receiving events of the event type by unsubscribing from one or more event queues queuing events of the event type (e.g., one or more queues of a message bus supporting distributed queuing of events of the event type). The candidate subscriber host, upon removing the event processing function for the event type and unsubscribing from receiving events of the event type, is no longer configured to operate as a subscriber that may handle events of the event type.

At block 599, method 500 ends.

It will be appreciated that, although omitted from method 500 of FIG. 5 for purposes of clarity, the selected candidate subscriber host may accept or reject the request from the management system. If the selected candidate subscriber host accepts the request from the management system, the selected candidate subscriber host is configured such that it no longer support handling of events of the event type. If the selected candidate subscriber host rejects the request from the management system, the selected candidate subscriber host informs the management system of the rejection and the management system may select a next candidate subscriber host from the set of candidate subscriber hosts and send to the next candidate subscriber host a request for the next candidate consumer host to remove the event processing function for the event type and to unsubscribe from receiving events of the event type.

It will be appreciated that, although omitted from method 500 of FIG. 5 for purposes of clarity, if the set of candidate subscriber hosts is empty (e.g., initially empty or becomes empty where none of the candidate subscriber hosts agrees to stop supporting the event processing function for the event type), the management system may decline the request to scale in the event processing function.

It will be appreciated that, although primarily presented with respect to embodiments in which the event handling system includes a centralized management system (illustratively, the MS 130 of the event handling system 100), in at least some embodiments the event handling system may include a distributed management system which may support a hierarchical distribution of the management functions of the MS 130. An example of an event handling system using a distributed management system is presented in FIG. 6.

Figure 6:
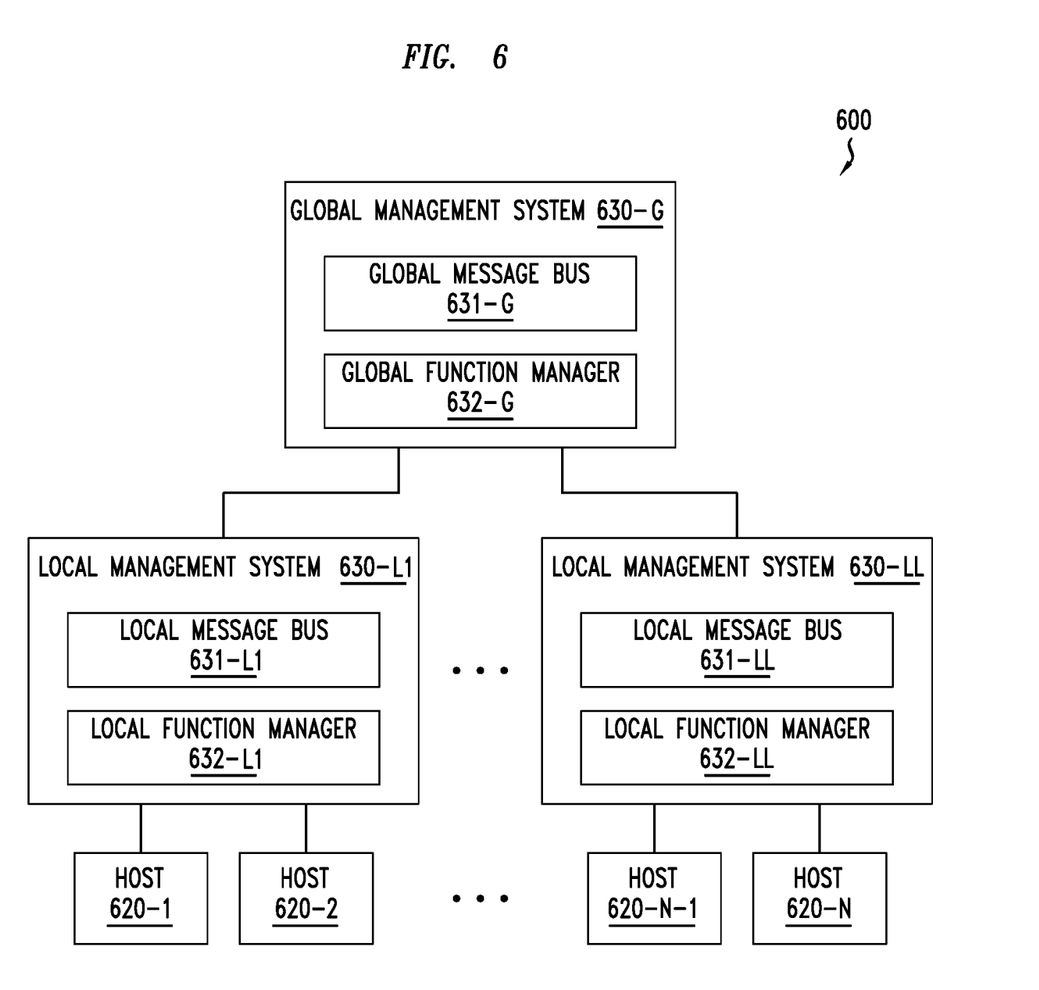
FIG. 6 depicts an event handling system configured to support distributed handling of events based on a distributed management system.

FIG. 6 depicts an event handling system configured to support distributed handling of events based on a distributed management system.

The event handling system 600 is a hierarchical event handling system including a set of hosts 620-1-620-N (collectively, hosts 620) and a hierarchical arrangement of management systems 630 supporting communications by the hosts 620. The management systems 620 including a global management system 630-G and a set of local management systems 630-L1-630-LN (collectively, local management systems 630-L). The local management systems 630-L support respective subsets of the hosts 620. The management systems 630 cooperate to provide a hierarchical messaging system configured to support communication of events between hosts 620 (illustratively, global management system 630-G includes a global message bus 631-G and a global function manager 632-G) and a hierarchical function control system configured to support scaling of hosts 620 (illustratively, each local management system 630-Lx includes a local message bus 631-Lx and a local function manager 632-Lx).

The global message bus 631-G and local message buses 631-L may be configured to cooperate to support hierarchical distributed event queuing. The global message bus 631-G and local message buses 631-L each may be configured to maintain sets of event queues for queuing of events, respectively. The event queues may be maintained for event types, hosts 620, or combinations thereof. The local message buses 631-L may be configured to handle events locally, if possible, and to forward events that cannot be handled locally to the global message bus 631-G. A local message bus 631-Lx of a local management system 630-Lx, based on a determination that too many events of a given event type are being sent to the global message bus 631-G (e.g., based on one or more of a threshold number of events of the event type, a threshold rate of events of the event type, or the like), may request scale out of the event processing function that is configured to process events of that event type (e.g., configuring one of the associated hosts 620 to support processing of events of that event type). A local message bus 631-Lx of a local management system 630-Lx, based on a determination that the workload of a given event type can be balanced on fewer hosts 620 without overloading those hosts 620, may request scale in of the event processing function that is configured to process events of that event type (e.g., configuring one of the associated hosts 620 to stop supporting processing of events of that event type). The local message bus 631-Lx may request scaling (e.g., scale out or scale in) of the event processing function from the associated function manager 632-Lx of the management system 630-Lx. The global message bus 631-G may be configured to provide similar functions across the local message buses 631-L (e.g., observing the events forwarded by the local message buses 631-L and making host scaling decisions for the various hosts 620 supported by the various local message buses 631-L).

The global function manager 632-G and local function managers 632-L may be configured to cooperate to support hierarchical distributed function management. The hierarchical distributed function management may support scaling of hosts 620 for event types, which may include scale out of hosts 620 for event types and scale in of hosts 620 for event types. As indicated above, a function manager 632 may receive a request from an associated message bus 631 to perform scale out of hosts 620 for an event type. If the function manager 632 determines that the request to replicate an event processing function cannot be served locally by the function manager 632 (e.g., none of the hosts 620 associated with the corresponding management system 630 are able to support scaling for the event processing function), the function manager 632 may forward the request to a function manager 632 at the next hierarchical level (e.g., a function manager 632-Lx escalates the request to the function manager 632-G). At that next hierarchical level, the message bus 631 holds information on sub-level message buses 631 that subscribe to the event types at that higher level. At any level, the function manager 631 may attempt to fulfill the request in the same way (e.g., the information exchange among sub-levels collected by the message bus 631 is reviewed and sub-level locations are identified in a manner the same as or similar to the way in which hosts 620 would be identified for host scaling). The function manager 632 of a higher level (e.g., function manager 632-G) would then ask a function manager 632 at a sub-level (e.g., a function manager 632-Lx) to scale associated the associated hosts 620 by replicating an event processing function on one or more of the associated hosts 620. If the function manager 632 at the current level is unsuccessful, it may escalate the request up to the next hierarchical level. The escalation may proceed up the hierarchy until the request is fulfilled or a determination is made at the top hierarchical level that the request cannot be fulfilled. It will be appreciated that, although primarily described with respect to support for scale out of hosts 620, similar capabilities may be used to support scale in of hosts 620.

The event handling system 600 the hierarchical levels may be a 'host-local' level, a 'regional' level, and a 'global' level. The lowest level is the 'host-local' level, e.g., queue management and function management at a single host 620 manages its repository of loaded (cached) event processing function code. At this level, the function manager 632 manages only one candidate and a function is either available or not available. The second level, which is referred to as the 'regional' level, is a level at which resource sharing experiences higher latency and lower bandwidth. While 'host-local' shared memory can be used for both communication and data sharing, 'regional' access requires networking for communication and data sharing. The 'regional' level employs a distributed (networked) implementation of the queue and function management. At the 'global' level, regions can collaborate to share excess load. In at least some embodiments, requests to replicate an event processing function may be implemented as events themselves, i.e., the function manager 632 publishes the event to a specific queue (e.g., asking a single host 620 or a sub-level to replicate the event processing function) or forwards the event to a higher-level (e.g., effectively asking the higher-level function manager 632 to dispatch the replication event to a suitable queue). It will be appreciated that, although primarily described with respect to support for scale out of hosts 620, similar capabilities may be used to support scale in of hosts 620.

In at least some embodiments, a function manager 632 may be implemented as a serverless function that is triggered by events to support scaling of other functions (in which case the function manager 632 may have special access to replication or delete a function from a local management system 630-L).

It will be appreciated that the event handling system 600, although primarily presented as being organized in a particular manner, may be organized in various other ways (e.g., using other numbers, types, or arrangements of function managers or hosts, other numbers or arrangements of hierarchical levels, or the like, as well as various combinations thereof).

Figure 7:
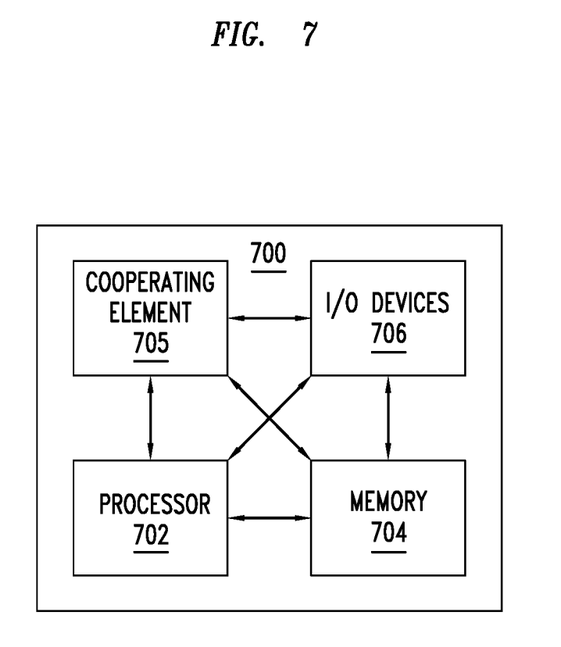
FIG. 7 depicts a high-level block diagram of a computer suitable for use in performing various functions presented herein.

FIG. 7 depicts a high-level block diagram of a computer suitable for use in performing various functions described herein.

The computer 700 includes a processor 702 (e.g., a central processing unit (CPU), a processor having a set of one or more processor cores, or the like) and a memory 704 (e.g., a random access memory (RAM), a read only memory (ROM), or the like). The processor 702 and the memory 704 are communicatively connected.

The computer 700 also may include a cooperating element 705. The cooperating element 705 may be a hardware device. The cooperating element 705 may be a process that can be loaded into the memory 704 and executed by the processor 702 to implement functions as discussed herein (in which case, for example, the cooperating element 705 (including associated data structures) can be stored on a non-transitory computer-readable storage medium, such as a storage device or other storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 700 of FIG. 7 may represent a general architecture and functionality suitable for implementing functional elements described herein, portions of functional elements described herein, or the like, as well as various combinations thereof. For example, computer 700 may provide a general architecture and functionality that is suitable for implementing one or more of an element of communication system 110, a host 120 or a portion thereof, the MS 130 or a portion thereof, an element of communication system 310, a host 320 or a portion thereof, the MS 330 or a portion thereof, a host 620 or a portion thereof, the global management system 630-G or a portion thereof, a local management system 630-Lx or a portion thereof, or the like, as well as various combinations thereof.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including a set of instructions:
wherein the set of instructions is configured to, when executed by the at least one processor, cause the apparatus to:
determine, from a set of hosts for an event type of events configured to be processed based on an event processing function for the event type, a set of publisher hosts configured to publish events of the event type and a set of subscriber hosts configured to process events of the event type;
determine, based on the set of publisher hosts and the set of subscriber hosts, a set of candidate subscriber hosts which are candidates to begin handling events of the event type;
select, from the set of candidate subscriber hosts, a selected candidate subscriber host; and
initiate configuration of the selected candidate subscriber host to begin handling events of the event type.

2. The apparatus of claim 1, wherein the set of candidate subscriber hosts includes ones of the hosts that are included in the set of publisher hosts but that are not included in the set of subscriber hosts.

3. The apparatus of claim 1, wherein the selected candidate subscriber host is selected based on an ordered list of the candidate subscriber hosts.

4. The apparatus of claim 1, wherein the selected candidate subscriber host is selected based on respective candidate scores of respective candidate subscriber hosts.

5. The apparatus of claim 4, wherein the respective candidate scores of the respective candidate subscriber hosts are based on respective load contributions of the respective candidate subscriber hosts to an overall workload for the event type.

6. The apparatus of claim 4, wherein the respective candidate scores of the respective candidate subscriber hosts are based on a score function configured to favor ones of the hosts that most contribute to an overall workload for the event type.

7. The apparatus of claim 4, wherein, for at least one of the candidate subscriber hosts, a respective candidate score of a respective candidate subscriber host is based on a geometric mean of contribution of the at least one of the candidate subscriber hosts to an overall workload of the event type.

8. The apparatus of claim 1, wherein, to initiate configuration of the selected candidate subscriber host to begin handling events of the event type, the set of instructions is configured to, when executed by the at least one processor, cause the apparatus to:

send, toward the selected candidate subscriber host, a request for the selected candidate subscriber host to obtain the event processing function for the event type and to subscribe to receive events of the event type.

9. A method, comprising:
determining, from a set of hosts for an event type of events configured to be processed based on an event processing function for the event type, a set of publisher hosts configured to publish events of the event type and a set of subscriber hosts configured to process events of the event type;
determining, based on the set of publisher hosts and the set of subscriber hosts, a set of candidate subscriber hosts which are candidates to begin handling events of the event type;
selecting, from the set of candidate subscriber hosts, a selected candidate subscriber host; and
initiating configuration of the selected candidate subscriber host to begin handling events of the event type.

10. An apparatus, comprising:
at least one processor, and
at least one memory including a set of instructions;
wherein the set of instructions is configured to, when executed by the at least one processor, cause the apparatus to:
determine, from a set of hosts for an event type of events configured to be processed based on an event processing function for the event type, a set of publisher hosts configured to publish events of the event type and a set of subscriber hosts configured to process events of the event type;
determine, based on the set of publisher hosts and the set of subscriber hosts, a set of candidate subscriber hosts which are candidates to stop handling events of the event type;
select, from the set of candidate subscriber hosts, a selected candidate subscriber host; and
initiate configuration of the selected candidate subscriber host to stop handling events of the event type.

11. The apparatus of claim 10, wherein the set of candidate subscriber hosts includes ones of the hosts that are included in the set of subscriber hosts but that are not included in the set of publisher hosts.

12. The apparatus of claim 10, wherein the selected candidate subscriber host is selected based on an ordered list of the candidate subscriber hosts.

13. The apparatus of claim 10, Wherein the selected candidate subscriber host is selected based on respective candidate scores of the respective candidate subscriber hosts.

14. The apparatus of claim 13, wherein the respective candidate scores of the respective candidate subscriber hosts are based on respective load contributions of the respective candidate subscriber hosts to an overall workload for the event type.

15. The apparatus of claim 13, wherein the respective candidate scores of the respective candidate subscriber hosts are based on a score function configured to favor ones of the hosts that least contribute to an overall workload for the event type.

16. The apparatus of claim 13, wherein, for at least one of the candidate subscriber hosts, a respective candidate score of a respective candidate subscriber host is based on a geometric mean of contribution of the at least one of the candidate subscriber hosts to an overall workload of the event type.

17. The apparatus of claim 10, wherein, to initiate configuration of the selected candidate subscriber host to stop handling events of the event type, the set of instructions is configured to, when executed by the at least one processor, cause the apparatus to:
send, toward the selected candidate subscriber host, a request for the selected candidate subscriber host to remove the event processing function for the event type and to unsubscribe from received events of the event type.

18. A method, comprising:
determining, from a set of hosts for an event type of events configured to be processed based on an event processing function for the event type, a set of publisher hosts configured to publish events of the event type and a set of subscriber hosts configured to process events of the event type;
determining, based on the set of publisher hosts and the set of subscriber hosts, a set of candidate subscriber hosts which are candidates to stop handling events of the event type;
selecting, from the set of candidate subscriber hosts, a selected candidate subscriber host; and
initiating configuration of the selected candidate subscriber host to stop handling events of the event type.

* * * * *